United States Patent
Kormann

(10) Patent No.: US 6,931,828 B2
(45) Date of Patent: Aug. 23, 2005

(54) HARVESTING MACHINE COMPRISING A MONITORING DEVICE FOR MONITORING THE SHARPNESS OF CUTTING BLADES AND/OR THEIR DISTANCE TO A COUNTER-CUTTER

(75) Inventor: Georg Kormann, Homburg (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/915,854

(22) Filed: Aug. 11, 2004

(65) Prior Publication Data

US 2005/0072135 A1 Apr. 7, 2005

(30) Foreign Application Priority Data

Oct. 7, 2003 (DE) .......................... 103 46 412

(51) Int. Cl.$^7$ ............................................ A01D 75/08
(52) U.S. Cl. ........................................ 56/250; 56/500
(58) Field of Search ........................... 56/250, 500, 60; 241/37, 101.74, 101.76, 101.77, 101.2; 451/421

(56) References Cited

U.S. PATENT DOCUMENTS

| | | | | |
|---|---|---|---|---|
| 4,479,346 A | * | 10/1984 | Chandler | 56/250 |
| 4,678,130 A | * | 7/1987 | Martenas | 241/222 |
| 4,934,612 A | * | 6/1990 | Johnson | 241/37 |
| 5,096,132 A | * | 3/1992 | Rauch et al. | 241/241 |
| 5,098,027 A | * | 3/1992 | McClure et al. | 241/101.2 |
| 5,704,199 A | * | 1/1998 | Paquet et al. | 56/10.2 B |
| 6,119,442 A | | 9/2000 | Hale | |
| 6,475,063 B2 | * | 11/2002 | Wolf | 451/5 |
| 2003/0217538 A1 | * | 11/2003 | Pirro | 56/16.4 A |

FOREIGN PATENT DOCUMENTS

| | | |
|---|---|---|
| DE | 38 16 206 | 5/1988 |
| DE | 40 23 113 | 7/1990 |
| DE | 40 23 114 | 7/1990 |
| DE | 41 34 957 | 10/1991 |
| DE | 43 35 786 | 10/1993 |
| DE | 199 03 153 | 1/1999 |
| DE | 102 35 919 | 7/2002 |
| EP | 0 706 752 | 5/1988 |
| EP | 0 943 888 | 3/1999 |
| EP | 1 053 671 | 3/2000 |

* cited by examiner

*Primary Examiner*—Árpád F Kovács

(57) ABSTRACT

A harvesting machine includes a pick-up unit for picking up the harvested crop, a cutting device that is equipped with at least one cutting edge that cooperates with a counter-cutter for cutting and/or chopping the harvested crop, and a monitoring device, which can be operated to generate a signal containing information about the sharpness of the edge and/or its distance to the counter-cutter, with the sharpness and distance each being compared to a target value. The monitoring device receives signals generated by an optical sensor, which visually monitors the cutting device and/or the cut harvested crop, wherein the signal of said sensor is used so that the monitoring device can deduce information about the sharpness of the edge and/or its distance to a counter-cutter, and send out a control signal for effecting automatic sharpening of the cutting edge and/or adjustment of the counter-cutter.

9 Claims, 3 Drawing Sheets

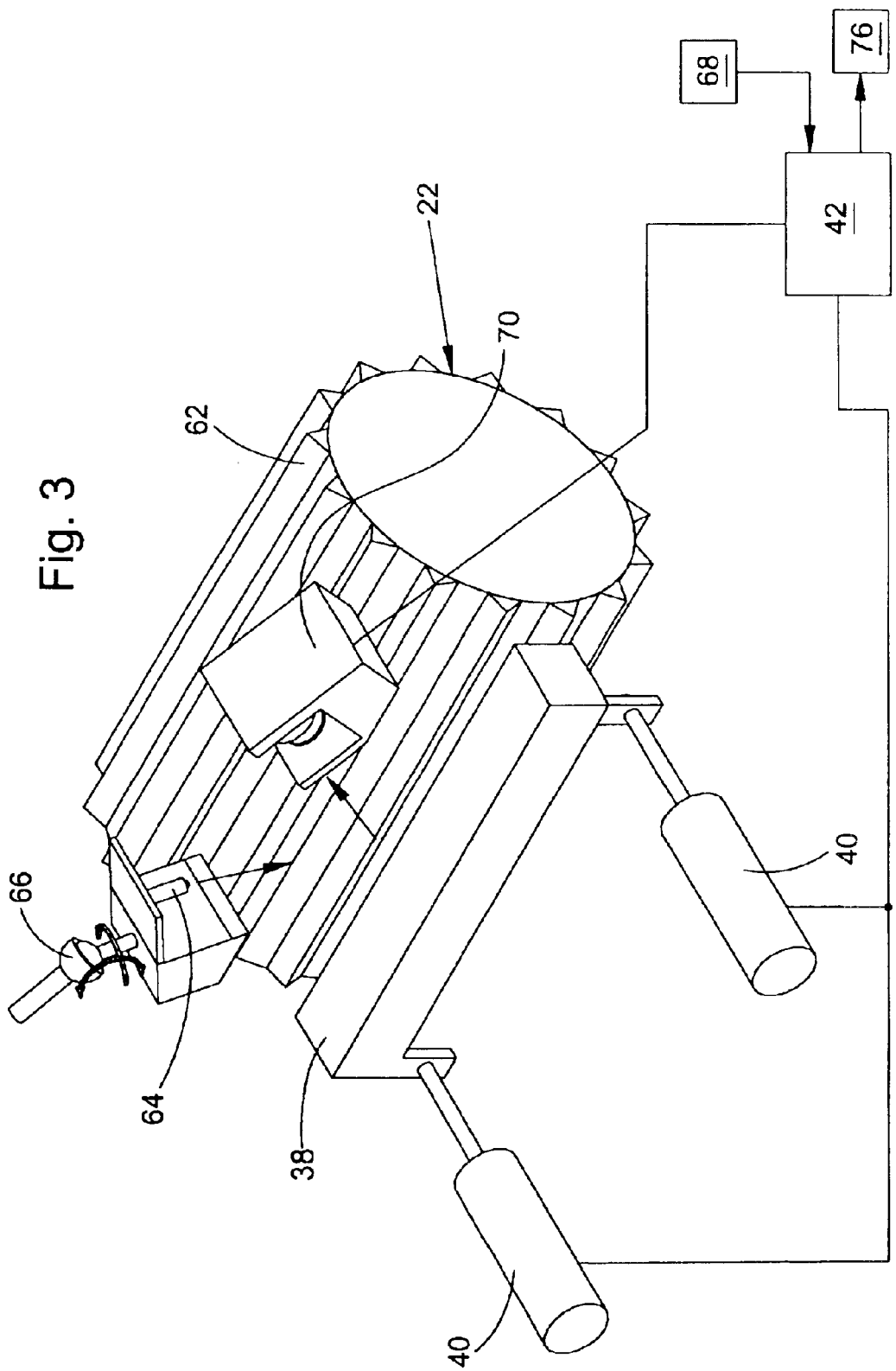

HARVESTING MACHINE COMPRISING A MONITORING DEVICE FOR MONITORING THE SHARPNESS OF CUTTING BLADES AND/OR THEIR DISTANCE TO A COUNTER-CUTTER

FIELD OF THE INVENTION

The invention relates to a harvesting machine comprising a pick-up unit for picking up the harvested crop, a cutting device that is equipped with at least one edge for cutting and/or chopping the harvested crop, and a monitoring device, which can be operated to generate a signal containing information about the sharpness of the edge and/or its distance to a counter-cutter, which is compared to a target value.

BACKGROUND OF THE INVENTION

Harvesting machines of the above kind, such as forage harvesters, baling presses or forage wagons, are equipped with cutting devices for cutting and/or chopping the harvested crop. Such cutting devices are also used on harvester-threshers to chop the threshed straw, if desired. For the cutting results it is important that the edge or edges of the cutting device are sufficiently sharp. In the case of dull edges the energy that is required for the cutting operation increases. If the harvested crop is not chopped in a freely cutting manner, i.e. without the use of a counter-cutter, a counter-cutter may be useful. The distance between the counter-cutter and the edge is likewise critical and should be adjusted as accurately as possible.

In the currently commercially available harvesting machines it is up to the driver to decide whether and when a sharpening operation of the edge occurs. Adjustment of the counter-cutter currently also only occurs at the request of the driver.

In various publications devices have been described for determining the sharpness of chopping blades. Pursuant to DE 40 23 113 A and DE 40 23 114 A the tension induced by the edges in inductive transmitters is evaluated. DE 199 03 153 A suggests the detection of the cutting forces. DE 102 35 919 A and DE 103 03 504 A reveal the mechanical detection of vibrations of the counter-cutter to determine sharpness.

To measure the distance between the edges and the counter-cutter a series of devices have been suggested (DE 41 34 957 A, DE 43 35 786 A, EP 0 706 752 A), in which a vibration sensor is attached on the counter-cutter, the output signal of which sensor is a function of the distance between the counter-cutter and the chopping blades. To measure the distance between the counter-cutter and the chopping blades moreover also magnetic sensors are known, which comprise a permanent magnet that is connected with the counter-cutter and an induction coil, in which the passing chopping blades induce an electro-motive force, which is amplified and detected (EP 0 943 888 A).

DE 38 16 206 A describes a cutting device for double fabrics, which comprises a knife, whose exact positioning and sharpness is examined by means of an opto-electrical sensor. It is composed of a camera, which detects the knife, and an electronic evaluating unit. Said publication discloses no suggestions for using the sensor in an agricultural harvesting machine.

Furthermore a series of publications is available in which the harvested crop is monitored visually. U.S. Pat. No. 6,119,442 A describes a harvester-thresher, in which a camera is directed at the harvested crop being processed. The camera signals are evaluated and compared to target values. The operating parameters of the harvester-thresh are modified as a function of the results of the comparison. EP 1 053 671 A suggests to examine the chopped harvested crop by means of a sensor operating in the near infrared region so as to detect contents. The measurement values of the sensors can also be used to deduce characteristics of the harvested crop, such as crude fiber content or fiber length. These publications do not reveal that the signals of the optical sensors are suitable for determining sharpness or for measuring the distance between the counter-cutter and edge.

SUMMARY OF THE INVENTION

It is the object of the invention to provide an improved harvesting machine, in which the decision as to whether sharpening of the edge or an adjustment of the counter-cutter is required can be made automatically and accurately.

An object of the invention is to provide a harvesting machine including a chopper equipped with a monitoring device for checking the condition of the cutting blades and/or the distance between the cutting blades and the counter-cutter and/or crop condition, with the monitoring device being coupled to a control arrangement for initiating one or the other of a sharpening routine and/or a counter cutter adjusting routine when the monitored condition indicates such action is desirable.

The foregoing object is achieved by providing a monitoring device with an optically operating sensor, which can be operated such that it monitors the cutting device visually. Its signal is used to deduce information about the sharpness of the edge and/or its distance to the counter-cutter. This system also allows the detection of defective blades and shifted blades. Alternatively, or additionally, the harvested crop that is chopped by the cutting device, the cut length and quality of which depends on the sharpness of the edge and possibly its distance to the counter-cutter, is visually monitored by a sensor, and the sensor's signal is used to gain information about the sharpness of the edge and/or its distance to the counter-cutter. The monitoring device provides an output signal, which contains information about the sharpness of the edge and/or the distance to the counter-cutter. The output signal and/or information deduced thereof is compared by the driver or automatically with a target value.

One advantage of using optical sensors is the accuracy that can be achieved. The sensors can, different from the inductive or mechanical sensors used in the prior art, be attached at a specific distance to the cutting device and hence in a position in which they are exposed to the influence of the harvested crop and the vibrations caused by the cutting device only to a relatively limited extent. Moreover a missing or defective cutting blade can be detected immediately, and the driver can be informed.

Depending on the results of the comparison, the driver can be provided with a visual or acoustic indication, which causes him to perform a sharpening operation and/or to re-adjust the distance between the cutting device and the counter-cutter. The above operations can also be performed automatically without intervention by the driver, possibly while driving or during the harvesting process. The sharpening operation can likewise be detected by the optical sensor so that in the case of a sharpening operation that is terminated at a suitable time based on the signals of the sensor no more material than is required is actually ground off. Similarly, the adjusting operation is terminated as a function of the signal of the optical sensor.

In one embodiment of the invention, the sensitive area of a sensor of the monitoring device is directed at the cutting device. Hence it detects the shape of the cutting edges of the blade and is adjusted such that it detects its sharpness. If it is also supposed to detect the distance between the edge and the counter-cutter, the sensor preferably additionally also detects the counter-cutter.

Various possibilities for designing the optical sensor are feasible. On one hand, it can be an imaging sensor, i.e. a camera, which comprises a large-surface image sensor with one- or two-dimensional resolution. Its signal is preferably digitized and processed by means of an image processing software. The result of this processing operation represents information about the sharpness of the edge and/or its distance to the counter-cutter. In order to achieve sufficient illumination, it may be useful to expose the area that is to be depicted to a secondary light source. The light source can illuminate the area in points and scan the surface that is to be examined or it can illuminate a large surface. On the other hand, it can be a non-imaging sensor, i.e. a light-sensitive element, which emits a signal as a function of its illumination level. Such sensors can be used in particular with scanning light sources, e.g. lasers. The sensors described in this paragraph can be used to detect the cutting device and possibly the counter-cutter, and also can be used for detecting the condition of the harvested crop released by the cutting device.

Especially for examination of the cut harvested crop an optical sensor (spectrometer) can be employed, which operates in the near infrared region. The cut edges of the harvested crop offer different spectra than the uncut surfaces since they have a different surface composition. The spectra that are gained can hence be used to calculate the surface ratio between uncut and cut surfaces and the cut length.

BRIEF DESCRIPTION OF THE DRAWINGS

The drawing shows two embodiments of the invention, which are described more closely in the following.

FIG. 3 is a schematic, left front perspective view of a second embodiment of a monitoring device constructed pursuant to the invention.

DESCRIPTION OF THE PREFERRED EMBODIMENT

Figure 1:
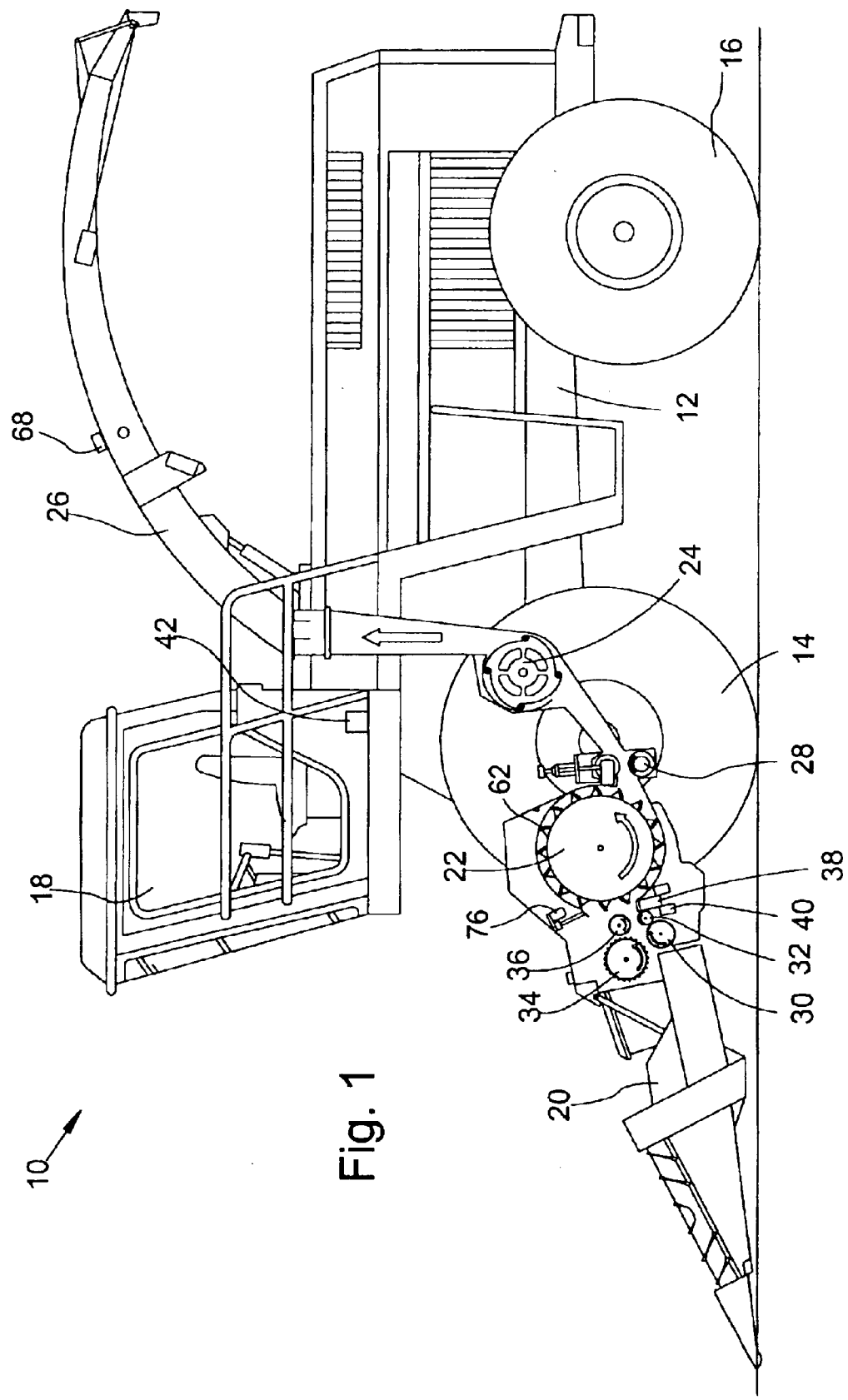
FIG. 1 is a schematic, left side view of a harvesting machine constructed pursuant to the invention.

A harvesting machine 10, illustrated in FIG. 1 in form of a self-propelled forage harvester, is composed of a frame 12, which is supported by front and rear wheels 14 and 16. Operation of the harvesting machine 10 occurs from a driver cabin 18, from where a pick-up unit 20 for picking up the harvested crop is visible. Harvested crop that is picked up by means of the pick-up unit 20, e.g., corn, grass or the like, is fed to a cutting device 22 comprising a chopper in the form of a closed cylinder having a plurality of cutting blades 62 arranged about its circumference. The forward edges of the cutting blades 62 cooperate with a counter-cutter or shear bar 38 to chop the harvested crop into small pieces and forward them to a conveying device 24. The crop leaves the harvesting machine 10 and enters a trailer following along the side of the machine via a discharge chute 26 that can rotate about the vertical axis and is adjustable in its tilt. A kernel processor 28 extends between the cutting device 22 and the conveying device 24, with which the conveyed harvested crop is fed tangentially to the conveying device 24.

The crop is transported between the pick-up unit 20 and the cutting device 22 by a feed roll arrangement including lower pre-pressing rollers 30, 32 and upper pre-pressing rollers 34, 36. The counter-cutter 38 is equipped with an adjusting device 40, which is arranged such that the counter-cutter 38 can travel in the horizontal direction towards the cutting device 22 and away from it. The adjusting device 40 serves to adjust the cutting gap.

On the top of the discharge chute 26, an optical (spectroscopic) sensor 68 operating in the near infrared region is arranged, which contains a spectrometer. It supplies the shredded crop flowing through the discharge shaft 26 with broad-band infrared light. The light reflected by the harvested crop is subjected to a wavelength analysis. Based on the spectra that are gained, the contents of the harvested crop can be identified and quantified. Moreover, the spectra contain information about the cut length of the harvested crop since the cut surfaces emit different spectra than those of uncut surfaces. The sensor 68 can be designed as described in EP 1 053 671 A, the disclosure of which is hereby included in the present document by way of reference.

Figure 2:
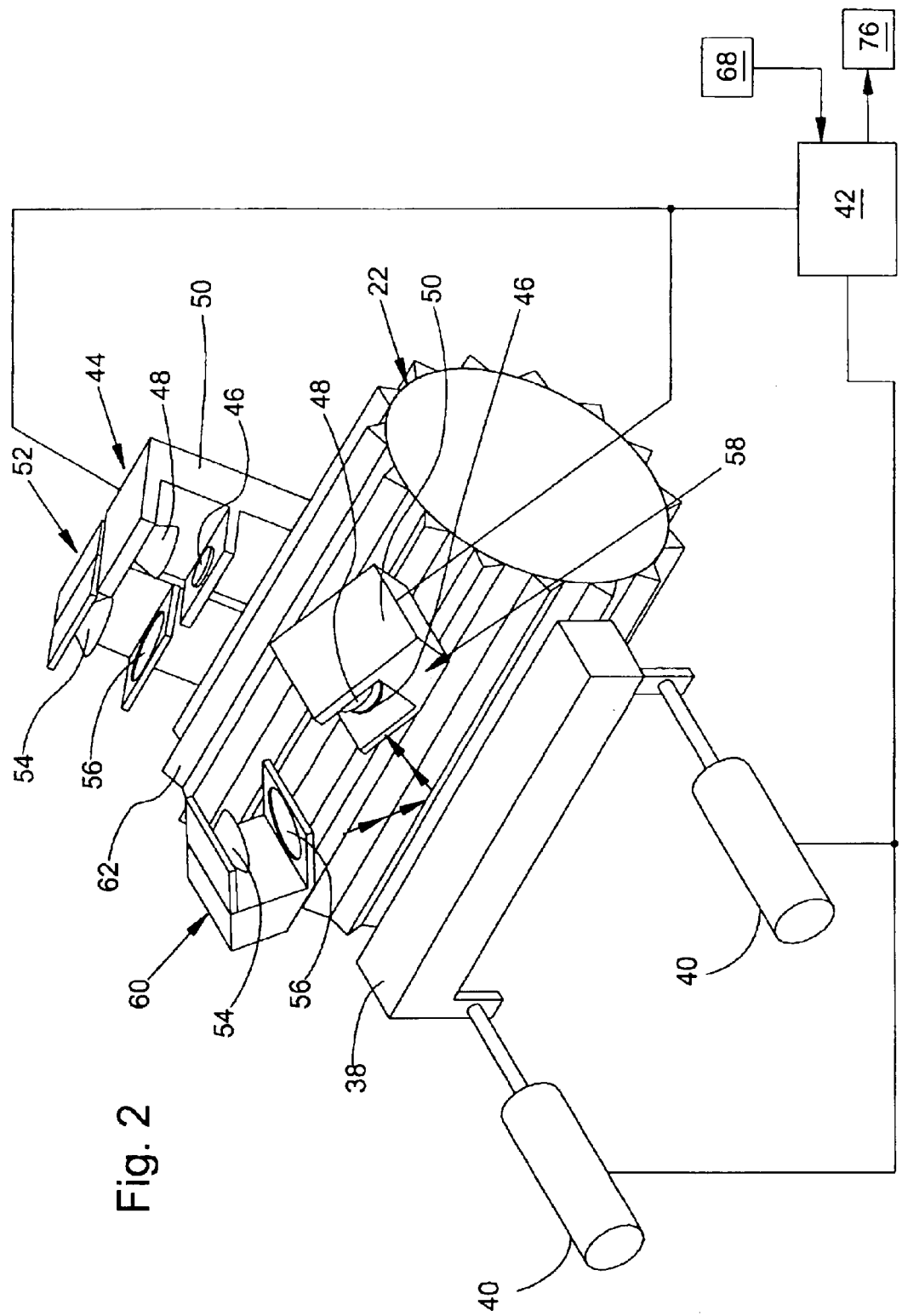
FIG. 2 is a schematic, left front perspective view of a first embodiment of a monitoring device constructed pursuant to the invention.

The monitoring device pursuant to the invention for monitoring the sharpness of the cutting blades 62 as well as the distance between the counter-cutter 38 and the cutting blades 62 of the cutting device 22 is illustrated in more detail in FIG. 2. It comprises a monitoring device 42, which is connected to a first camera 44. The first camera 44 consists of a lens 46, an image sensor 48 (e.g. CCD) and a housing 50. Apart from the camera 44 a first illuminating device 52 comprising a lamp 54 and a collimator 56 is installed. A second camera 58, the design of which is in agreement with that of the first camera 44, is likewise connected to the monitoring device 42. The second camera 58 is assigned a second illuminating device 60, the design of which agrees with that of the first illuminating device 52.

The first illuminating device 52 is arranged in the upper region of the cutting device 22 and illuminates it across a large area. The first camera 44 detects the top of the cutting device 22. In relation to the driving direction of the harvesting machine 10, the second illuminating device 60 is located to the right above the counter-cutter 38 and the area of the cutting device 22 adjacent to the counter-cutter 38 and illuminates all the mentioned surfaces. The second camera 50 is located in relation to the driving direction of the harvesting machine 10 to the left above the counter-cutter 38 and the region of the cutting device 22 adjacent to the counter-cutter and monitors the aforementioned surfaces.

The lenses 46 create images of the cutting blades 62 (camera 44) and the cutting gap as well as the region adjacent to the cutting gap of the cutting blade 62 and the counter-cutter 38 (camera 50) on the image sensors 48.

The signals of the image sensors 48 are fed to the monitoring device 42. There they are digitized and subjected to an image processing operation, in which, on one hand, based on the signals of the camera 44, the cutting edges of the cutting blades 62 are extracted and compared to a target shape. If this shows that the cutting edges are not sufficiently sharp, a sharpening device 76 is activated or the driver is provided with an appropriate message. Analogous to this, the sharpening operation is terminated as a function of the signals issued by the camera 44.

On the other hand, the gap between the counter-cutter 38 and the cutting blades 62 is extracted from the signals of the camera 50 and compared to a target distance. When it is larger or smaller than corresponding, pre-defined limit values, the monitoring device 42 initiates the automatic activation of the adjusting device 40 in order to bring the counter-cutter 38 into a target position in relation to the cutting blades 62 or indicates to the driver to proceed accordingly. Here as well, the motion of the adjusting device 40 is terminated when the monitoring device 42 detects, based on the signals from the camera 50, that the counter-cutter 38 has reached its target position.

The monitoring device 42 also receives signals from the spectroscopic sensor 68. It conducts a comparison between the cut length that the spectroscopic sensor 68 measured and the cut length that is calculated based on the speed of the cutting device 22 and the pre-pressing rollers 30–36. When the cut length is greater than expected, the sharpening device 76 likewise initiates a sharpening operation, either automatically or by informing the driver. If the signals of the spectroscopic sensor 68 indicate an insufficient cut quality (too large, frayed surface due to unclean cut), then an adjustment of the counter-cutter 38 can be initiated.

It would also be feasible to forego the second camera 50 and the second illuminating device 60 if only the sharpness of the cutting blades 62 is supposed to be detected. It would also be feasible to use the second camera 50 to determine the sharpness of the cutting blades 62 and forego the first camera 44 and the first illuminating device 52. It would also be possible to use only the spectroscopic sensor 68 or forego it.

In the described measuring process in particular, the detection of the cutting edges of the cutting blades 62 is problematic when the cutting device 22 is rotating. Here it is recommended to use a camera 44 with a corresponding speed and resolution or to equip it with a high speed shutter, or to take advantage of the pulsed illuminating device 52, which emits flashes that are sufficiently short. Alternatively, or additionally, the camera 44 is only used when the cutting device 22 rotates relatively slowly or stands still. Since the camera 50 will only be used to detect the gap between the counter-cutter 38 and the cutting blades 62, so that a less than sharp image of the cutting blades 62 due to the rotating cutting device 22 is insignificant, while the diacaustic curve they travel is of interest, measurements are less critical.

A second embodiment of the invention is illustrated in FIG. 3. Elements that agree with the first embodiment have been marked with the same reference numbers. Here a laser 64 is used, which, in relation to the driving direction of the harvesting machine 10, is arranged to the right above the counter-cutter 38, i.e., where in FIG. 2 the second illuminating device 64 is located. The laser 64 can be adjusted in two dimensions by means of an adjusting device 66, i.e., it can swivel motor-driven about the vertical axis and about a horizontal axis extending in the driving direction of the harvesting machine 10. A camera 70, the design of which agrees with that of the cameras 44, 50 from FIG. 2, is arranged in relation to the driving direction of the harvesting machine 10 to the left above the counter-cutter 38, i.e., where in FIG. 2 the second camera 50 is located. The adjusting device 66 and the camera 70 are connected to the monitoring device 42. Instead of the camera 70, it would also be feasible to use a non-imaging sensor in form of a photodiode or the like.

The monitoring device 42 causes the adjusting device 66 to gradually scan the gap between the counter-cutter 38 and the cutting blades 42 and the surfaces adjacent to the gap of the counter-cutter 38 and the cutting blades 62 in the driving direction and the perpendicular, horizontal direction thereto. Hereby the camera 70 generates information on the width of the gap. Additionally, based on the light that is reflected by the cutting blades 62, a conclusion can be drawn about their sharpness. Equivalent to the first embodiment, the sharpening device 76 and/or the adjusting device 40 of the counter-cutter 38 is activated automatically when, during the analysis of the digitized output signals of the camera 70 by means of the image processing software, it is found in the monitoring device 42 that the sharpness and/or gap width are not in agreement with the target values and/or corresponding information is forwarded to the driver. The sharpening and/or adjusting operations are terminated likewise preferably based on corresponding signals of the camera 70.

Having described the preferred embodiment, it will become apparent that various modifications can be made without departing from the scope of the invention as defined in the accompanying claims.

What is claimed is:

1. In a harvesting machine including a pick-up unit for picking up the harvested crop, a chopper equipped with at least one cutting edge, a counter-cutter located for cooperating with said cutting edge for cutting and/or chopping the harvested crop, and a monitoring device, which can be operated to generate a signal containing information about the sharpness of the edge and/or its distance to said counter-cutter and containing a target value to which is said signal of said monitoring device may be compared, the improvement comprising: a sensor, which visually monitors at least a condition of one of the cutting device or the cut harvested crop and sends a signal representing the monitored condition to said monitoring device, so that said monitoring device can deduce information about the sharpness of the edge and/or its distance to a counter-cutter.

2. The harvesting machine, as defined in claim 1, wherein a sharpening device is provided for sharpening said edge; said monitoring device being coupled to said sharpening device for activating the latter for effecting automatic sharpening of said edge as a function of the signal of the monitoring device.

3. The harvesting machine, as defined in claim 1, wherein an adjusting device is provided for adjusting the position of said counter-cutter relative to said cutting edge; said monitoring device being coupled to said adjusting device for activating the latter for effecting automatic adjustment of said counter-cutter as a function of the signal of said monitoring device.

4. The harvesting machine, as defined in claim 1, wherein said sensor is an optical sensor having a sensitive area directed at said cutting device.

5. The harvesting machine, as defined in claim 4, wherein said sensitive area of said optical sensor is directed at said counter-cutter and an adjacent area of said cutting device.

6. The harvesting machine, as defined in claim 4, wherein said sensor is a camera; said monitoring device including an imaging processing software for digitizing and processing an imaging output signal of said camera.

7. The harvesting machine, as defined in claim 6, and further including an illuminating device used in conjunction with said camera for illuminating a large area of said cutting device within a view of said camera.

8. The harvesting machine, as defined in claim 1, wherein said sensor device is an optical sensor located downstream from said cutting device in a location for interacting with cut harvested crop for detecting a length of cut of said cut harvested crop.

9. The harvesting machine, as defined in claim 8, wherein said optical sensor operates in a near infrared area.

* * * * *